United States Patent [19]
Clements et al.

[11] Patent Number: 6,103,119
[45] Date of Patent: *Aug. 15, 2000

[54] FILTER CARTRIDGES HAVING TRACK ETCHED MEMBRANES AND METHODS OF MAKING SAME

[75] Inventors: James G. Clements, Stratham, N.H.; William Stephen Macomber, North Berwick, Me.; Suzanne Surprenant, Stratham, N.H.

[73] Assignee: Whatman Inc., Haverhill, Mass.

[ * ] Notice: This patent is subject to a terminal disclaimer.

[21] Appl. No.: 09/228,663

[22] Filed: Jan. 12, 1999

Related U.S. Application Data

[63] Continuation of application No. 08/585,499, Jan. 16, 1996, Pat. No. 5,904,846.

[51] Int. Cl.$^7$ ................................................. B01D 29/07
[52] U.S. Cl. .................... 210/493.1; 210/321.77; 210/321.86; 210/489; 210/493.2; 55/498; 55/502; 156/625
[58] Field of Search ................ 210/321.77, 321.86, 210/489, 493.1, 493.2, 500.27, 321.72, 490, 488, 500.1; 55/498, 502; 156/625

[56] References Cited

U.S. PATENT DOCUMENTS

| | | |
|---|---|---|
| 3,303,085 | 2/1967 | Price et al. . |
| 3,415,993 | 12/1968 | Fleischer et al. . |
| 3,438,504 | 4/1969 | Furman . |
| 3,457,339 | 7/1969 | Pall et al. . |
| 3,471,019 | 10/1969 | Trasen et al. . |
| 3,487,943 | 1/1970 | Buckman . |
| 3,612,871 | 10/1971 | Crawford . |
| 3,662,178 | 5/1972 | Caputi et al. . |
| 3,673,017 | 6/1972 | Peterson . |
| 3,677,844 | 7/1972 | Fleischer et al. . |
| 3,708,418 | 1/1973 | Quinn . |
| 3,713,921 | 1/1973 | Fleischer et al. . |
| 3,770,532 | 11/1973 | Bean et al. . |
| 3,770,962 | 11/1973 | Fleischer et al. . |
| 3,802,972 | 4/1974 | Fleischer et al. . |
| 3,811,999 | 5/1974 | Fleischer et al. . |
| 3,850,813 | 11/1974 | Pall et al. . |
| 3,852,134 | 12/1974 | Bean . |
| 3,855,477 | 12/1974 | Fleischer . |
| 3,865,919 | 2/1975 | Pall et al. . |
| 3,867,294 | 2/1975 | Pall et al. . |
| 4,154,688 | 5/1979 | Pall . |
| 4,245,506 | 1/1981 | Meikleijohn . |
| 4,268,347 | 5/1981 | Stephens . |
| 4,379,180 | 4/1983 | Baglin et al. . |
| 4,392,958 | 7/1983 | Ganzi et al. . |
| 4,402,830 | 9/1983 | Pall . |
| 4,416,724 | 11/1983 | Fischer . |
| 4,512,892 | 4/1985 | Ganzi et al. . |
| 4,515,007 | 5/1985 | Herman . |
| 4,521,309 | 6/1985 | Pall . |

(List continued on next page.)

FOREIGN PATENT DOCUMENTS

| 2 556 607 | 2/1985 | France . |
|---|---|---|
| 32 40 143 A1 | 10/1982 | Germany . |

OTHER PUBLICATIONS

English language Abstract of German Patent DE 32 40 143 A1.
1991 Costar–Nucleopore catalog.
PCT International Search Report.

*Primary Examiner*—Ana Fortuna
*Attorney, Agent, or Firm*—Daniel P. Cillo; Arnold B. Silverman; Eckert Seamans Cherin & Mellot, LLC

[57] ABSTRACT

A filter cartridge that includes a track etched membrane sealed therein in a leak-free manner, and a method for making the cartridge. The filter cartridge has a bubble point that is at least 50% of the bubble point of the track etched membrane. In one embodiment, the method includes disposing the track etched membrane below a heat source and orienting the membrane so that it melts back on itself, and then allowing the membrane to cool to form a leak-free seal.

31 Claims, 5 Drawing Sheets

U.S. PATENT DOCUMENTS

| | | |
|---|---|---|
| 4,579,698 | 4/1986 | Meyering et al. . |
| 4,609,465 | 9/1986 | Miller . |
| 4,614,109 | 9/1986 | Hofmann . |
| 4,619,897 | 10/1986 | Hato et al. . |
| 4,664,801 | 5/1987 | Thomas . |
| 4,671,873 | 6/1987 | Keller . |
| 4,701,861 | 10/1987 | Kauke . |
| 4,714,516 | 12/1987 | Eichelberger et al. . |
| 4,715,960 | 12/1987 | Thompson . |
| 4,725,332 | 2/1988 | Spohr . |
| 4,744,240 | 5/1988 | Reichelt . |
| 4,767,426 | 8/1988 | Daly et al. . |
| 4,779,448 | 10/1988 | Gogins . |
| 4,824,568 | 4/1989 | Allegrezza, Jr. et al. . |
| 4,830,917 | 5/1989 | Carpentrr et al. . |
| 4,832,997 | 5/1989 | Balanzat et al. . |
| 4,846,970 | 7/1989 | Bertelsen et al. . |
| 4,872,988 | 10/1989 | Culkin . |
| 4,898,670 | 2/1990 | Gollan . |
| 4,906,371 | 3/1990 | Miller . |
| 4,923,608 | 5/1990 | Flottmann et al. . |
| 4,929,354 | 5/1990 | Meyering et al. . |
| 4,933,564 | 6/1990 | Kiefer et al. . |
| 4,956,089 | 9/1990 | Hurst . |
| 4,956,219 | 9/1990 | Legras et al. . |
| 5,053,125 | 10/1991 | Willinger et al. . |
| 5,064,529 | 11/1991 | Hirayama et al. . |
| 5,079,272 | 1/1992 | Allegrezza, Jr. et al. . |
| 5,139,624 | 8/1992 | Searson et al. . |
| 5,183,607 | 2/1993 | Beall et al. . |
| 5,230,760 | 7/1993 | Tanabe . |
| 5,234,538 | 8/1993 | Lück . |
| 5,238,717 | 8/1993 | Boylan . |
| 5,271,839 | 12/1993 | Mova et al. . |
| 5,277,811 | 1/1994 | Mova . |
| 5,282,380 | 2/1994 | DiLeo et al. . |
| 5,318,531 | 6/1994 | Leone . |
| 5,328,613 | 7/1994 | Beall et al. . |
| 5,336,405 | 8/1994 | Tang et al. . |
| 5,350,487 | 9/1994 | Ameen et al. . |
| 5,353,630 | 10/1994 | Soda et al. . |
| 5,360,650 | 11/1994 | Grimes . |
| 5,417,101 | 5/1995 | Weich . |
| 5,498,335 | 3/1996 | Mova . |
| 5,536,290 | 7/1996 | Stark et al. . |
| 5,556,598 | 9/1996 | Raybuck et al. . |
| 5,904,846 | 5/1999 | Clements et al. .................. 210/321.77 |

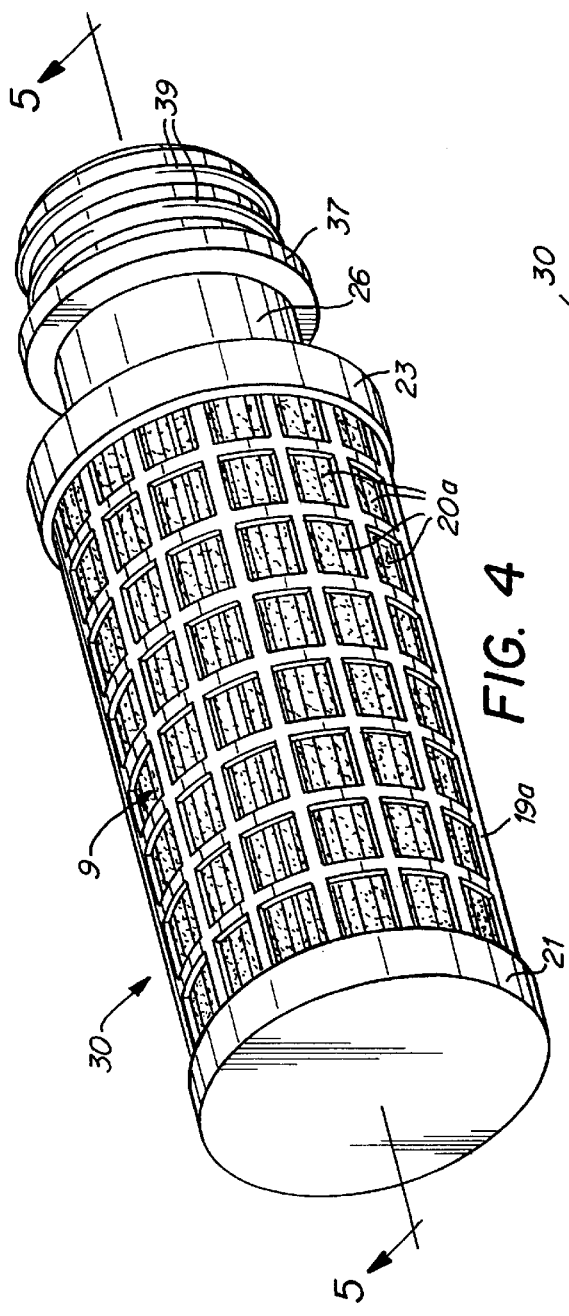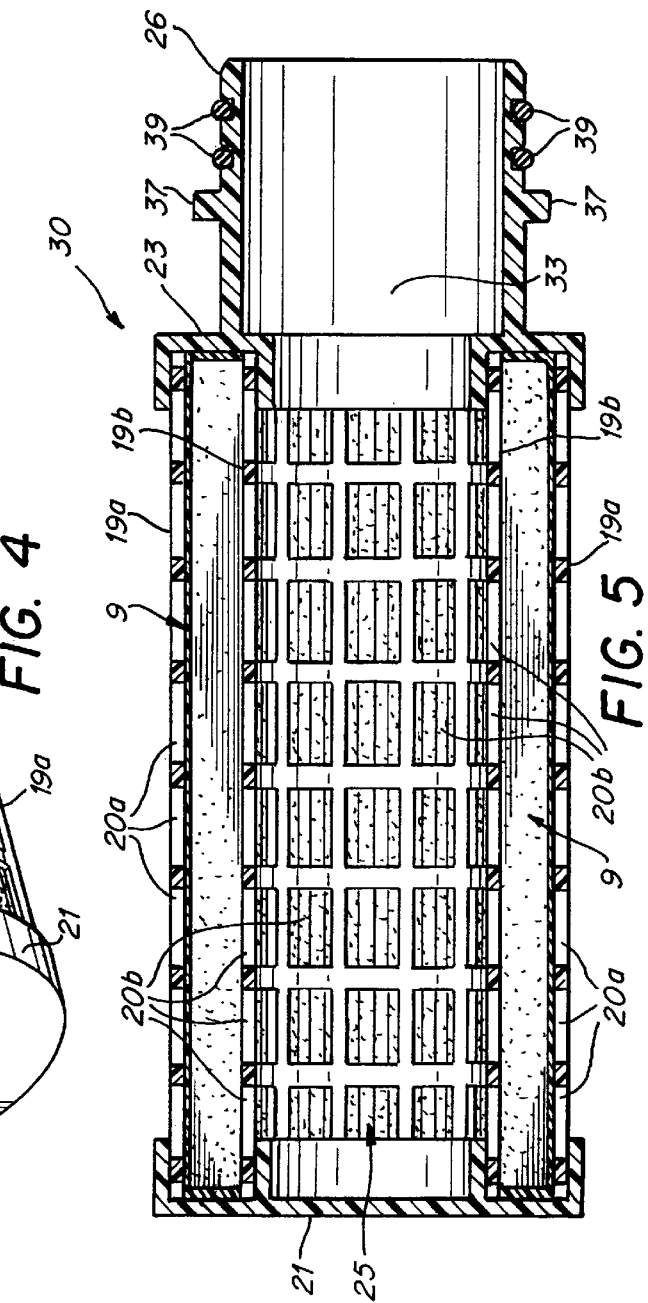

FILTER CARTRIDGES HAVING TRACK ETCHED MEMBRANES AND METHODS OF MAKING SAME

This application is a continuation of application Ser. No. 08/585,499, filed Jan. 16, 1996, entitled FILTER CARTRIDGES HAVING TRACK ETCHED MEMBRANES AND METHODS OF MAKING SAME, and now U.S. Pat. No. 5,904,846.

BACKGROUND OF THE INVENTION

1. Field of the Invention

The present invention is directed to filter cartridges that employ track-etched membranes as their filter media, and methods of making such filter cartridges.

2. Discussion of the Related Art

Filter cartridges are used to remove impurities from fluids in a number of different applications, such as water purification, chemical processes wherein impurities are removed from reaction mixtures during product synthesis, and medical applications wherein impurities are filtered from a liquid before the liquid is passed into a patient. Filter cartridges conventionally include a filter medium formed from a sheet of porous material that is pleated and folded into a corrugated cylinder to provide a large filtration area in a relatively small volume. The cylinder of filter material is inserted into a housing that provides structural rigidity to the filter cartridge, and the housing is then closed at each end with an end cap. The untreated fluid is directed through the sidewalls of the housing and passed through the filter, which removes fine impurities and contaminants from the fluid. The filtered fluid flows into a passageway in the center of the cylindrical filter material, and is removed from the cartridge through an outlet port in one or both of the endcaps.

Filter cartridges are typically required to provide a predefined level of purification by preventing any impurities above a specified size from passing therethrough. To maintain the integrity of the cartridge and ensure that no untreated fluid can pass therethrough, the filter medium is sealed in a fluid-tight manner to the endcaps, such that all fluid exiting the output port of the cartridge is guaranteed to have passed through the filter medium.

The filter media used in conventional filter cartridges are typically porous sponge cast membranes that include a number of cavities that are designed to produce the effective pore size required for the filter cartridge. Such membranes suffer from several disadvantages. First, the arrangement of cavities is designed to provide a predetermined effective pore size only to a statistical degree of certainty, and cannot guarantee that paths do not exist through the membrane that exceed the effective pore size, such that contaminants could potentially slip through the filter medium. Second, because of its construction, the sponge cast member absorbs some material that is smaller than the effective pore size of the filter and should be passed through, thereby undesirably altering the filtrate. Third, the particles filtered from the fluid cannot be recovered from the sponge cast membrane, which is disadvantageous for some applications.

Track etched membranes have been used as filters in a number of applications, and do not suffer from the above-described disadvantages of sponge cast membranes. Track etched membranes are formed by bombarding a solid film with particles that form tracks of damaged material through the film. The film is then subjected to a chemical agent that selectively etches the damaged tracks to create perforations through the film. The diameters of the perforations can be controlled by the residence time of the etchant on the film. Thus, the film can be provided with pores that all are equal to or smaller than the maximum pore size required for the filtration application, ensuring that no impurities can pass through the film that are larger than the specified maximum pore size. Furthermore, the particles filtered from the liquid can be easily recovered from the track etched membrane, which also does not trap material that is smaller than the membrane pores.

In view of the foregoing, it has been desired to provide a filter cartridge that includes a track etched membrane as the filter medium. However, conventional methods for forming filter cartridges have been found to be ineffective in sealing a track etched membrane to the cartridge end caps, resulting in faulty seals and cartridges that fail integrity testing. For example, U.S. Pat. No. 3,457,339 discloses a method for sealing a conventional filter medium to a pair of filter cartridge end caps formed from thermoplastic material. The end caps are initially heated to a temperature above the softening point of the thermoplastic material, and the filter medium is then inserted downward into the softened end cap and imbedded therein. The end cap is then allowed to cool. The thermoplastic material is said to penetrate the pores of the filter material to ensure a leak-proof seal.

Although the technique described in the '339 patent has apparently been successful in connection with other types of filter media, it cannot be used with a track etched membrane. In particular, the assignee of the present application has unsuccessfully attempted to produce a filter cartridge using substantially similar techniques for sealing a track etched membrane to the end caps. The failed sealing technique involved heating each end cap until it was molten, or providing a mass of molten material in the end cap, and then inserting the end of the track etched membrane downward into the molten end cap. The assembly was allowed to cool, in the hope that the molten material would form a fluid-tight seal between the end cap and the track etched membrane. However, integrity provable cartridges could not be made using this sealing technique, as gaps in the seal between the filter membrane and the end caps resulted in impurities bypassing the membrane and contaminating the filtrate. It is believed that the failure of this conventional sealing technique is attributable to track etched membranes being significantly thinner than conventional filter media. Thus, it is believed that when the track etched membrane was inserted downward into the molten end cap, the heat radiating therefrom caused the thin membrane to wilt upward, resulting in gaps between the resulting end cap seal and the track etched membrane.

Another technique for sealing a filter medium in a filter cartridge is disclosed in U.S. Pat. No. 4,956,089. In accordance with this technique, a die is provided in the shape of the end caps to be formed, and includes a heater disposed underneath. The filter medium and several support layers, which are formed from thermoplastic material, are inserted into the heated die and melted to form a layer of molten material that fills the recesses of the die. The material is then allowed to cool, forming an end cap with the filter medium imbedded therein. Because this technique also involves the insertion of the filter medium downward toward a heated element, it is believed that this technique would also fail to successfully seal a cartridge including a track etched filter membrane for the same reasons as the above-described failed technique.

Another conventional technique for sealing a filter medium to an end cap is disclosed in U.S. Pat. No. 4,392,958. In the disclosed method, an adhesive is spread onto the end caps, and the filter medium is inserted into the adhesive, which seals the filter medium to the end cap. A significant drawback to this technique is that in the filter cartridges formed thereby, the adhesive can leach into the solution, resulting in solvent contamination. Therefore, filter cartridges formed in accordance with this method often do not provide the desired level of filtration, limiting their utility.

In view of the foregoing, it is an object of the present invention to provide an integrity testable leak-proof filter cartridge that includes a track etched membrane, and a method for its formation.

SUMMARY OF THE INVENTION

In one illustrative embodiment of the invention, a filter cartridge is provided including a track etched membrane sealed therein in a leak-free manner.

In another illustrative embodiment of the invention, a filter cartridge is provided comprising a cartridge body, a track etched membrane disposed within the cartridge body, and means for sealing the track etched membrane within the cartridge body in a leak-free manner.

In a further illustrative embodiment of the invention, a method is provided of making a filter cartridge. The method includes the steps of: (A) disposing a track etched membrane within a filter cartridge body; and (B) sealing the track etched membrane in the filter cartridge body in a leak-free manner.

BRIEF DESCRIPTION OF THE DRAWINGS

The invention will be better understood and appreciated from the following detailed description of illustrative embodiments thereof, and the accompanying drawings, in which:

FIG. 4 is a perspective view of one embodiment of a completed filter cartridge in accordance with the present invention;

FIG. 5 a longitudinal cross-sectional view of the cartridge of FIG. 4 taken along section line 5—5 of FIG. 4;

DETAILED DESCRIPTION

Figure 1:
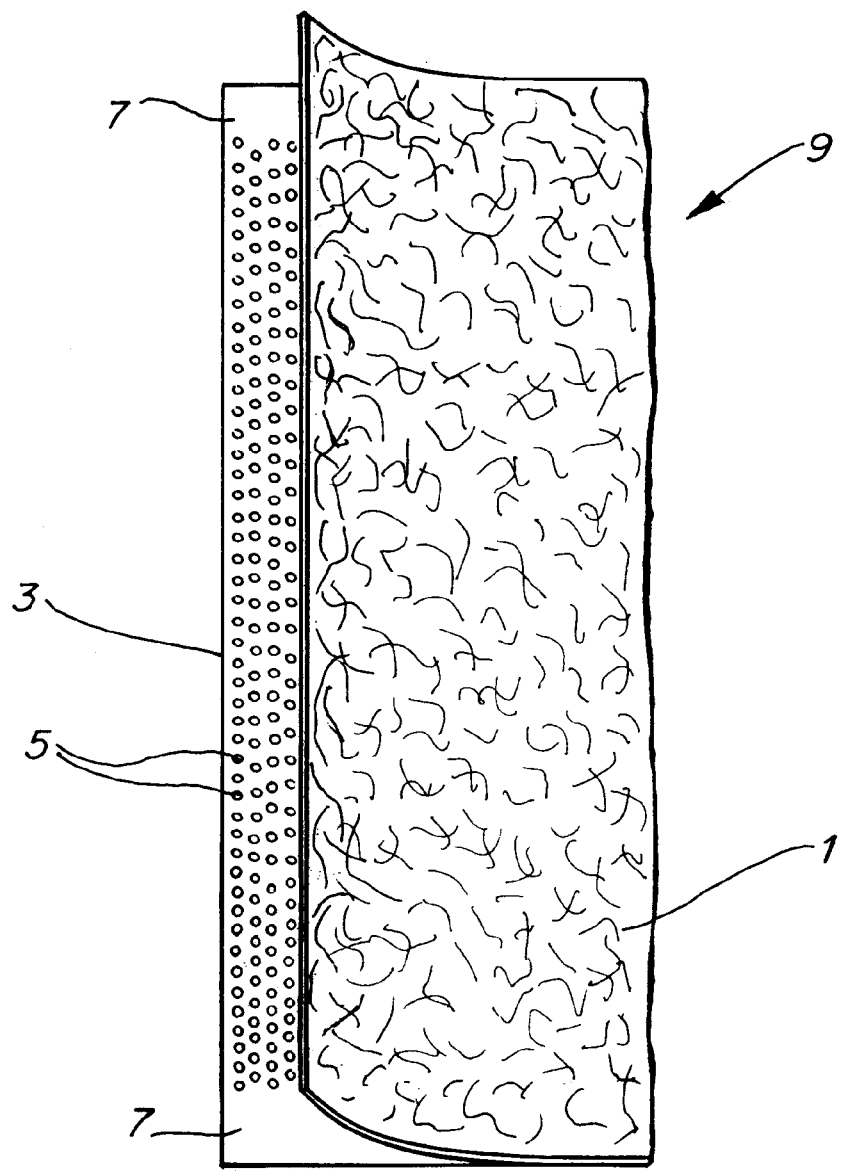
FIG. 1 is a perspective view of a track etched membrane and a support layer that can be used in forming a filter cartridge according to the present invention.

The present invention relates to filter cartridges that employ a track etched membrane as the filter medium, and are integrity testable and leak-free, i.e., all fluid passing through the filter cartridge passes through the track etched membrane. One method of determining whether a filter cartridge is leak-free is to measure a difference between the bubble point of the track etched membrane prior to incorporation into the filter cartridge, and the bubble point of the completed cartridge. If a filter cartridge includes a leak, it is expected that the difference in the bubble points of the membrane and the cartridge would be substantial. Therefore, a filter cartridge is integrity testable and leak-free if this difference is insubstantial. For the purpose of this application, a filter cartridge including a track etched membrane is considered to be integrity testable and leak-free if the bubble point of the cartridge is at least approximately 50% of the bubble point of the track etched membrane tested separately, although the difference in the bubble points is more preferably less than approximately 5–10%, with the bubble points being measured, for example, according to principles disclosed in *Basic Principles of Membrane Technology*, M. Mulder, Klumer Academic, 1991.

The present invention is further directed to a method for sealing a track etched membrane in a filter cartridge in a leak-free manner, i.e., sealing the track etched membrane in such a manner that the resulting filter cartridge is leak-free.

As mentioned above, track etching involves bombarding a solid film with particles to form weakened tracks. The track etched membrane used in connection with the filter cartridge of the present invention can be formed in accordance with any process for forming such membranes, and the present invention is not limited to membranes formed by any particular process. Examples of processes for forming track etched membranes are disclosed in U.S. Pat. Nos. 3,303,805; 3,662,178; 3,713,921; 3,802,972; and 3,852,134. In one embodiment of the invention, the particles used to form the damaged tracks are generated by a charged particle accelerator, such as an electrostatic accelerator (e.g., a Van de Graaff accelerator), a linear accelerator or a cyclic accelerator such as a cyclotron. The film may be positioned in the path of the accelerated particles using the techniques disclosed in U.S. Pat. No. 5,449,917, which is incorporated herein by reference, so that each charged particle creates multiple tracks in the film.

The track etched membrane is formed from a plastic film. The plastic may be a polymeric material, i.e., a polymerization product incorporating repeating chemical units. Polymeric materials include but are not limited to polyesters, polystyrenes, aromatic polyesters, polycarbonates, polyolefins, including polyethylene, polyethylene terephthalate, polypropylene, vinyl plastics such as polyvinyl difluoride (PVDF), and cellulose esters such as cellulose nitrate, cellulose butyrate and cellulose acetate. In one embodiment of the invention, the track etched membrane is formed from polyester. However, although an illustrative list of materials has been disclosed herein, it should be understood that the present invention is not limited to a membrane formed from any specific material, and that any material capable of being track etched can be used to form the track etched membrane used in the filter cartridge of the present invention.

The track etched membrane 3, shown in FIG. 1, may have any thickness that is consistent with the formation of a leak-free filter cartridge using the sealing method discussed below. The range of thicknesses typically available for track etched membranes is approximately 6–30 microns. Any membrane within this thickness range can be used in forming the cartridge of the present invention. However, the thickness of the track etched membrane used in the present invention is preferably in a range of 10–12 microns.

Pores 5 in the track etched film are formed by selectively etching the damaged film with a gas or liquid, with the residence time of the etchant determining the size of the pores. The track etched membrane 3 is exposed to the etchant for sufficient time to generate pores 5 that are sized to match the desired degree of filtration for the filter cartridge, which varies depending on the application in which the cartridge is to be used. The etching process conventionally produces holes that are symmetrical. However, a technique has also been developed by the applicant for producing pores that are asymmetric, with the pore on one side of the film being larger than on the other. Asymmetric holes can be formed by etching one surface of the film at a faster rate than the other. This can be accomplished by placing one surface of the film adjacent a material that precludes any reaction of the surface with the etchant. For example, the film can be bonded on one side to an aluminum drum so that the bonded surface is not exposed to the etchant. When a membrane having asymmetric holes is used in the filter cartridge of the present invention, the larger orifice should have a diameter that is at least 1.5 times that of the smaller orifice, but is preferably at least twice the diameter of the smaller orifice, and most preferably four times that of the smaller orifice. The diameter of a pore as used herein refers to the length of a chord which extends from one edge of the pore to another, without necessarily passing through the pore center. The pore diameter can be measured using a scanning electron microscopy (SEM) according to methods disclosed in *Basic Principles of Membrane Technology*, M. Mulder, Klumer Academic, 1991.

After formation, the track etched membrane is cut to the appropriate length and width, and pleated in a conventional manner to provide a relatively large filtration area. Because the membrane is so thin, a support layer can be provided to assist in pleating. As shown in FIG. 1, the support layer 1 is a sheet of material that is co-extensive with the track etched membrane 3. The support layer is preferably formed of the same material as the track etched membrane, or a compatible material for reasons discussed below. When the membrane is formed from polyester, the support layer 1 can be a sheet of spun polyester sold under the name REEMAY, which performs only crude pre-filtering because its pores are significantly larger than those of the track etched membrane. In the illustrative embodiment of FIG. 1, a single track etched membrane 3 and one support layer 1 are provided. However, the present invention is not so limited. The filter cartridge of the present invention can alternatively be formed with multiple track etched membranes and/or multiple support layers. In one embodiment of the invention, two track etched membranes are used, sandwiched between two co-extensive support layers. The collection of track etched membranes and support layers is referred to below as the filter material 9.

The support layer 1 may be arranged in any fashion with respect to membrane 3. In the embodiment of the invention discussed above, the support layer 1 is coextensive with the track etched membrane, extending along its entire surface. In this embodiment, the support layer is formed from a material having pores that are larger than those of the track etched membrane. Thus, the support layer acts as a pre-filter to filter out relatively large impurities, but performs no meaningful filtering of the particles that the track etched membrane is designed to remove. In an alternate embodiment of the invention, the support layer 1 is disposed only along each end of membrane 3, and can be formed from either porous or non-porous materials.

When support layers are used, each should be thick enough to support the membrane and enable it to be folded, and to pre-filter relatively large particles. However, the support layers should not be so thick that they interfere with the flow rate of the cartridge or prevent the formation of the desired number of pleats. Furthermore, making the support layers either extremely thick or thin may be prohibitively expensive. Therefore, each support layer preferably has a thickness between approximately 0.0005 inches and 0.01 inches, and more preferably between approximately 0.0005 inches and 0.002 inches.

In the embodiment shown in FIG. 1, the track etched membrane 3 includes a shadow region 7 along its top and bottom edges wherein no holes 5 are provided through the membrane. The holes 5 are exaggerated for the purpose of illustration, and are not individually visible to the naked eye. However, the shadow sections of the membrane are discernible with the naked eye because the other sections of the membrane having a milky appearance due to the high density of holes formed therein. The shadow regions reinforce the membrane, and facilitate the sealing of the filter material in the cartridge as described more fully below. However, it should be understood that although the shadow regions are advantageous, they are not essential, and the present invention can be practiced with track etched membranes that do not include such shadow regions.

Figure 2:
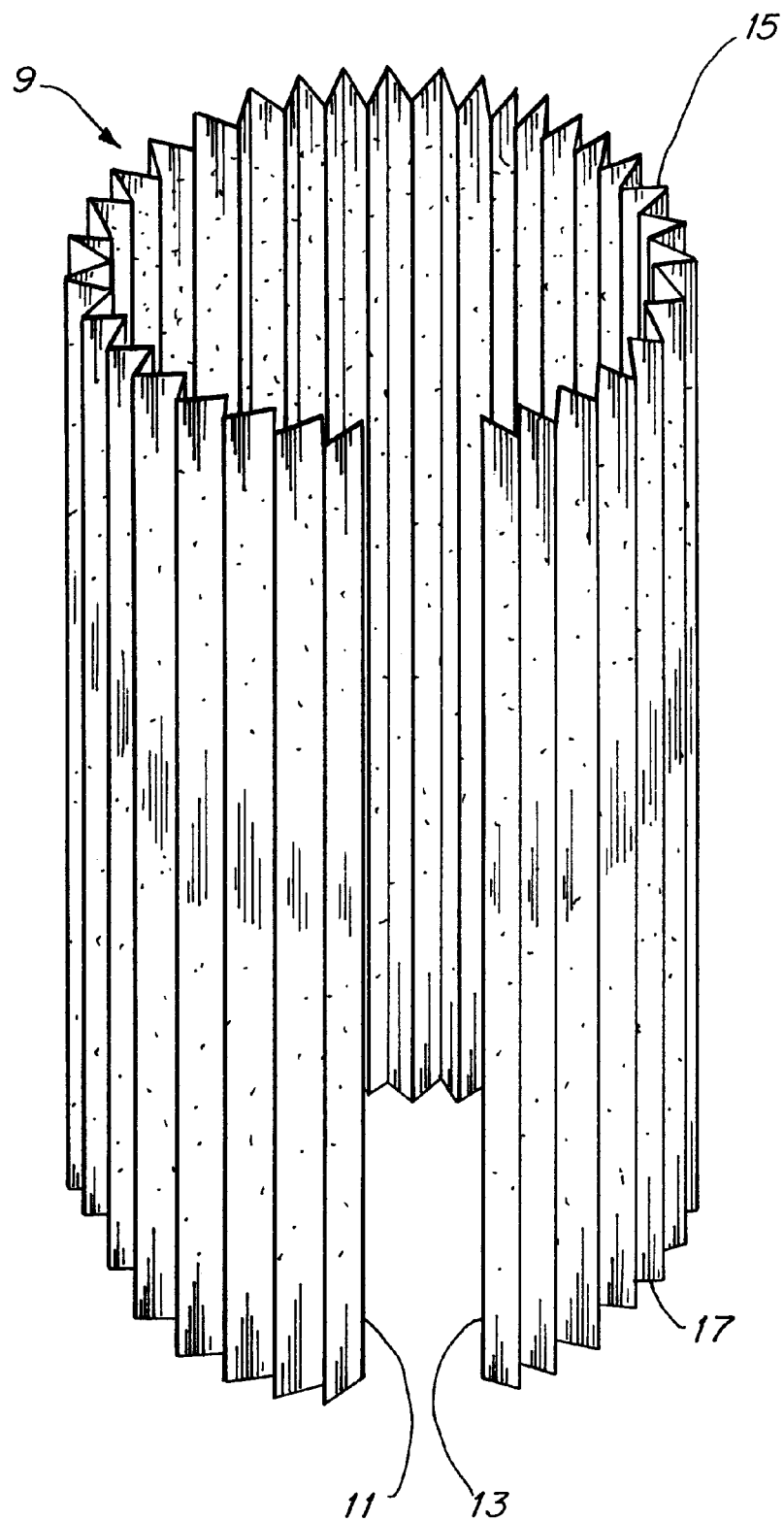
FIG. 2 is a perspective view of the membrane and support layer of FIG. 1, pleated and folded into a cylindrical configuration.

After being trimmed to the proper length and pleated, the filter material 9 can be arranged in a conventional cylindrical configuration as shown in FIG. 2. The two ends 11 and 13 are sealed together along the length of the cylinder by heating the material and fusing the ends together. Methods of forming such a corrugated cylinder are known to those skilled in the art and are disclosed in, for example, U.S. Pat. Nos. 2,732,031; 3,013,667; 3,457,339; and 3,850,813.

Figure 3:
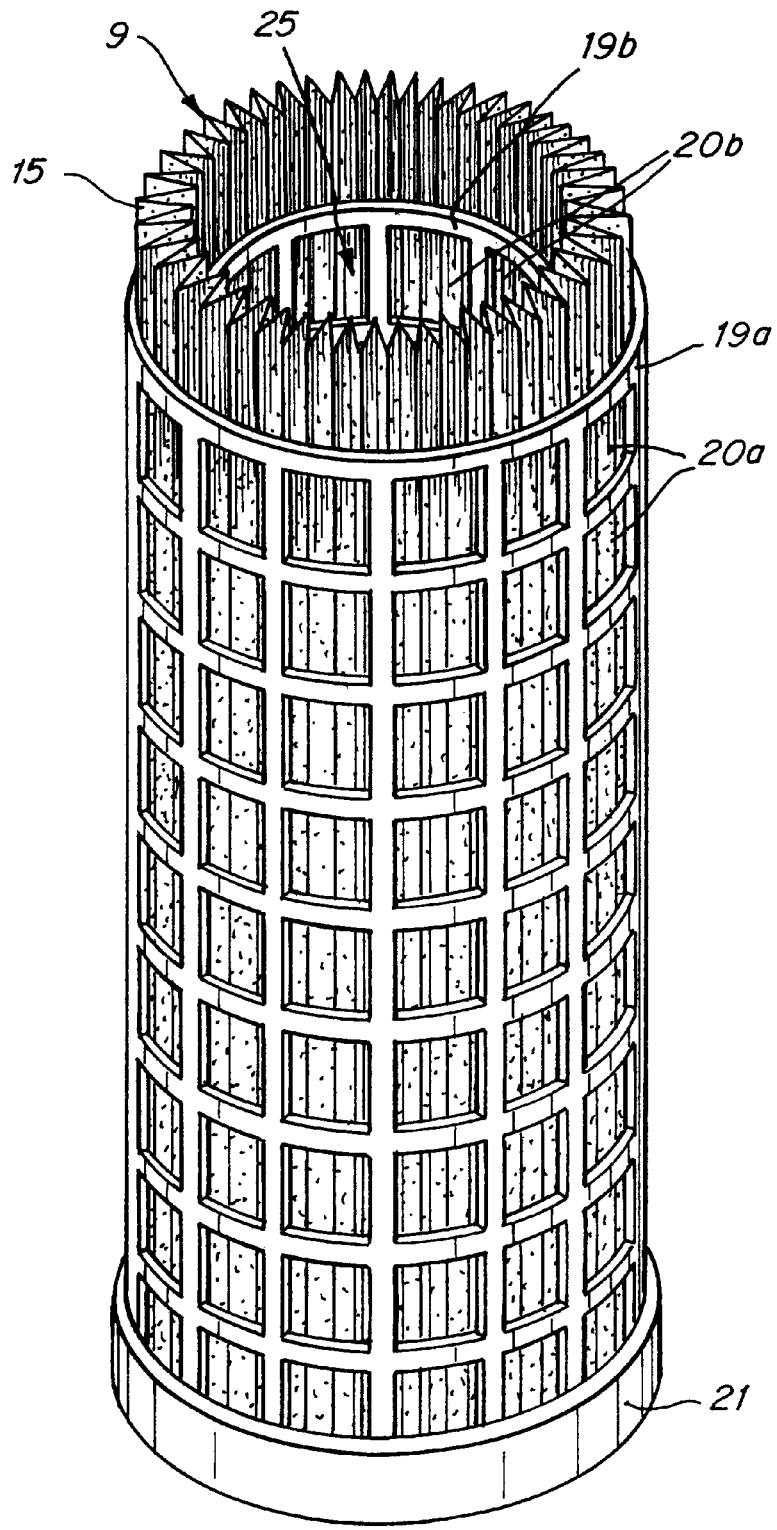
FIG. 3 is a perspective view of a partially formed filter cartridge in accordance with the present invention.

The cylinder of filter material is inserted into a conventional cage 19, as shown in FIG. 3. The cage 19 is formed of relatively rigid plastic, and includes a cylindrical outer section 19a and an inner section 19b that are sized so that the cylinder of pleated filter material fits snugly therebetween. The cage 19 protects the filter material from damage during the production, storage and use of the filter cartridge, and provides a relatively rigid construction to the cartridge. Cage 19 may be formed from a moldable polymeric material such as, for example, a polyolefin or a polyester. The outer and inner sections 19a and 19b respectively include ports 20a and 20b that allow fluid to pass therethrough. In the embodiment shown in the figures, the outer and inner sections of the cage 19 include ports that extend over their entire surfaces to form a screen-like mesh. However, it should be understood that the present invention is not limited to any particular cage arrangement, and that alternate arrangements can be used that provide mechanical support for the filter material and have ports that are sufficient to allow fluid to be passed through the filter cartridge.

While the filter cartridge is depicted in the figures as being formed in a conventional cylindrical shape, it should be understood that the present invention is not limited to such a configuration, and that the filter material 9 and cartridge can take on any shape. Polyhedrons are examples of other shapes in which the filter cartridge of the present invention can be formed.

To complete the filter cartridge 30 (FIGS. 4–5), each end of the pleated filter material is sealed in a manner described below, and an end cap is provided at each end of the cartridge. Only one end cap 21 is shown in FIG. 3, but the second end cap 23 is shown in FIGS. 4–5. The end caps close off the ends of the cartridge, forming a chamber in the interior 25 of the cylinder of filter material. End cap 23 (FIGS. 4–5) includes a port 33 in fluid communication with the interior 25 of the cylinder of filter material. In use, the filter cartridge is disposed in the chamber of a housing (not shown). Typically, the fluid to be filtered is directed into the housing chamber and passes through the cage and the filter material, with the filtrate being collected from the interior 25 via the end cap port 33. Alternatively, the flow can be reversed with the fluid to be filtered being directed into the end cap port 23, and the filtrate passing out the sides of the cartridge and being collected from the housing chamber.

In the embodiment disclosed in the figures, the filter cartridge allows fluid flow through only one end cap, with end cap 23 being open to fluid flow and end cap 20 being closed. End cap 23 can be designed to connect the filter cartridge to a cartridge housing for removing fluid from the port 33. In the embodiment illustrated in FIGS. 5–6, end cap 23 includes an outlet duct 26 that defines port 33 and includes a collar 37 and a pair of O-rings 39 for connecting the cartridge to a housing or other configuration. However, it should be understood that this connection mechanism can be formed in any of a number of ways, and that the present invention is not limited to any particular configuration. An example of an end cap connection that can be used in connection with the filter cartridge of the present invention is shown in U.S. Pat. No. 4,178,248.

Although the filter cartridge is shown in the figures as having only one of the end caps open to fluid flow, it should be understood that both end caps can be open to fluid flow.

Typically, fluid enters filter cartridge 30 through ports 20a in the outer section of the cage 19a, and passes through the filter material 9, with the filtrate passing through the ports 20b in the inner cage 19b and entering the interior 25 of the cartridge. The filtrate then is drawn from the cartridge through the port 33 in end cap 23. Alternatively, the fluid flow may be reversed as described above.

End caps 18 and 20 can take any shape that is consistent with forming a leak-free cartridge, and are preferably designed to support the cage 19 when assembled. The end caps are formed from a moldable polymeric material that is preferably the same material as the track etched membrane 3 and support layers 1, or a material that is compatible therewith to facilitate the sealing process as discussed below. In one embodiment of the invention, the end caps, the membrane 3 and the support layers 1 are all formed from polyester.

Figure 6:
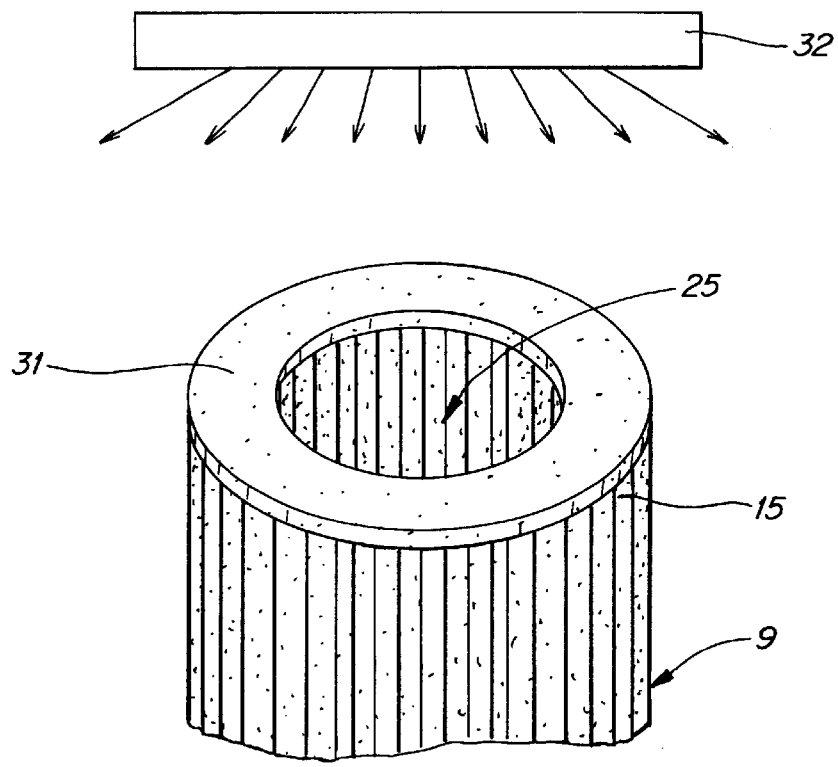
FIG. 6 is a view of one illustrative embodiment of the melt back process for forming a track etched filter cartridge in accordance with the present invention.

To ensure the integrity of the cartridge, the ends 15 and 17 (FIG. 2) of the cylindrical filter material are sealed so that no flow path exists through the cartridge that does not pass through the track etched membrane. In view of the failure of conventional sealing techniques as described above, a new process was developed for sealing the ends of the filter material in the present invention. This process is illustrated in FIG. 6. The end 23 of the filter material to be sealed is disposed adjacent a heat source 32. The heat source heats the end of the filter material to a temperature above its melting point, such that the end of the filter material begins to melt. The filter material is oriented relative to the heat source so it melts back on itself. As shown in FIG. 4, this can be accomplished, for example, by disposing the filter material below the heat source and orienting the filter material vertically.

The filter material is held adjacent the heat source until a film 31 of molten material is formed across its entire top surface, at which point the end 23 of the filter material is removed from the heat source. An end cap then is applied over the film of molten material, with the molten layer being disposed beneath the end cap. The molten layer melts the inner surface of the end cap, which can be pre-heated before being joined to the molten end of the filter material to facilitate melting of the end cap material, although pre- heating is not required. When cooled, the layer of molten material encapsulates the membrane 3 and forms a fluid-tight seal between the membrane and the end cap. Both ends of the filter material are sealed in the same manner. The seals are considered to be leak-free if the resulting cartridge is leak-free, i.e., if the cartridge has a bubble point equal to at least 50% of the bubble point of the track etched membrane.

As discussed above, the end cap is preferably formed from a material compatible with the material of the track etched membrane 3 and support layers 1. This facilitates the formation of a fluid-tight seal by reducing the likelihood that the membrane and end cap will separate as the molten junction solidifies. In contrast to some prior art sealing techniques, the leak-free seals formed in accordance with the present invention are formed only from cooling of the molten layer of material, without adhesives.

The heat source 32 can be a source of infrared (IR) radiation, such as a heat lamp. When an IR source is used, the filter material is held approximately one inch from the IR source long enough for the molten layer 31 to be formed across the entire surface of the end 23 of the filter material, which may be approximately one minute depending on the material used and the temperature of the heat source. It is believed that the ends of the filter material could alternatively be melted through direct contact with a heated surface formed from a material selected so that the molten filter material will not adhere to it, allowing the filter material to be withdrawn therefrom and cooled after melting.

The heat source 32 can be operated such that the temperature of the track etched membrane 3 and support layers 1 is increased in a controlled fashion. The maximum temperature to which the filter material is heated is preferably not high enough to detrimentally alter the physical or chemical nature of the material, and will vary depending on the particular materials used. For example, when the track etched membrane 3 and/or support layers 1 are formed from polyester, the heat source can be controlled to operate in a maximum temperature range from approximately 400° F. to approximately 600° F.

The above-described melt back sealing process has been found to reliably seal the ends of the filter cartridge to the end caps, resulting in a leak-free integrity testable cartridge. The melting back of the molten material onto the filter is believed to prevent any gaps from developing in the seal due to wilting of the track etched membrane as it nears the heat source. Further, the use of a single material (e.g., polyester) or compatible materials that form the membrane, the support layers and the end cap ensures that these components will not separate at the seal.

In an alternate embodiment of the invention, the filter material is not sealed to end caps at its ends. Rather, a seal on each end of the filter material is formed by melting the end of the filter material until the layer of molten material 31 (FIG. 6) entirely closes off the interior 25 of the cylindrical filter element. When the layer of molten material cools, it seals the filter element. Thereafter, an end cap can be applied to add structural support to the cartridge and enable connection to a housing or other components as described above, but would not participate in the seal. Since the end caps are not necessary to seal the filter cartridge, they need not be used at all if desirable for some applications.

As mentioned above in connection with FIG. 1, the track etched membrane 3 may include shadow regions 7 along its top and bottom edges. The shadow regions have a denser concentration of film material (e.g., polyester) than the perforate areas of the membrane, providing more molten material during the melt back sealing process to assist in ensuring the formation of a fluid-tight seal. The width of the shadow regions and the melt back process can be controlled such that portions of the shadow regions remain unmelted in the completed cartridge 30 (FIGS. 4–5) and extend from the seal, which can be helpful in preventing tearing of the track etched membrane at the junction where it is sealed to the end cap. Although providing the advantages discussed above, it should be understood that the shadow regions are not necessary to practice the present invention, and that the melt back sealing process of the present invention can be used to form a leak-free filter cartridge that includes a track etched membrane without shadow regions.

In another embodiment of the invention, the filter material also includes a strip, formed from the same material as the track etched membrane 3 and support layer 1, or a compatible material. The strip can have a smaller area than the track etched membrane and is loosely held and pleated between the membrane 3 and support layer 1 along their top and bottom edges. During the melt back process, the strip adds additional material to the molten layer 31 (FIG. 6), and facilitates the formation of a liquid-tight seal without gaps between the end cap and the track etched membrane.

Figure 7:
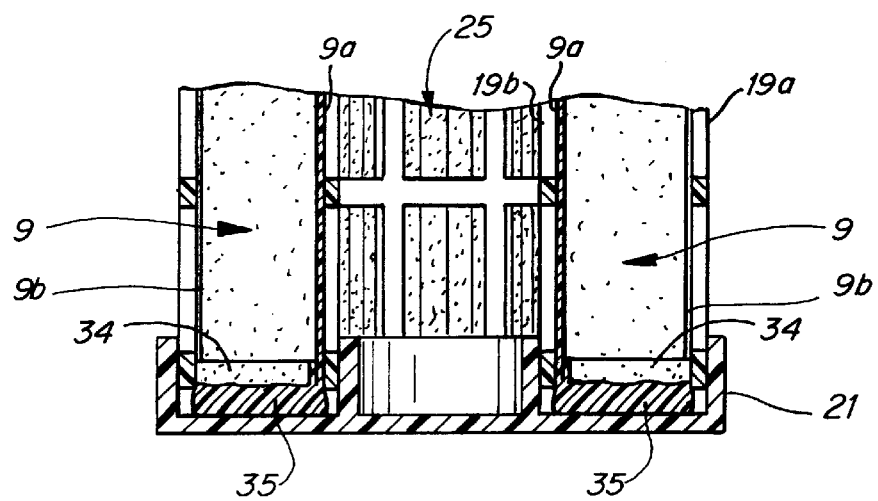
FIG. 7 is a cross-sectional view of one embodiment of a filter cartridge according to the present invention showing the seal formed between the track etched membrane and one end cap.

FIG. 7 is a cross-sectional view of a sealed end cap 20, and illustrates the partially melted strip 33 along with the seal 35 formed between the filter material 9 and the end cap when the molten layer solidifies. The seal 35 is essentially level, and in contrast to conventional cartridge seals formed according to a process such as the one disclosed in U.S. Pat. No. 3,457,339 discussed above, is not disposed at substantially different heights along the inner 9a and outer 9b edges of the filter material. In the illustrated embodiment, the strip 33 is disposed along the outer edge 9b of the filter material, which is the upstream side of the filter cartridge when used in the conventional manner. Alternatively, the strip can be disposed on the inner edge 9a of the filter.

In the embodiment illustrated in FIG. 7, the strip 33 does not melt completely during the melt back process, so that a section remains intact and extends from the seal 35. Alternatively, the strip 33 can be sized so that it melts entirely during the melt back process. Furthermore, it should be understood that although the additional strip 33 is advantageous, it is not essential, and that a track etched filter cartridge can be formed in accordance with the present invention without using such an additional strip.

The filter cartridge of the present invention can be used like conventional filter cartridges. Untreated fluid can be directed through the sidewalls of the cartridge cage 19 and passed through the track etched membrane enclosed therein. The membrane removes fine impurities and contaminants from the fluid, which then flows into the central passageway 25 (FIG. 5) in the cartridge. The filtrate is then removed from the cartridge through an outlet port in one or both of the end caps. The fluid-tight seals between the endcaps and the track etched membrane prevent untreated fluid from bypassing the membrane and entering the purified filtrate channel in the center of the cartridge.

The integrity of the filter cartridge of the present invention can be proved using a conventional bubble point test. The filter is wetted with water or some other liquid, and then a gas or liquid is introduced under gradually increasing pressure until the water is forced out of the filter pores. The bubble point for the filter cartridge is a predetermined pressure above which water is expected to freely pass therethrough. Where water flows through the cartridge at a pressure less than the predetermined bubble point, the cartridge is defective. Each filter can be individually tested for integrity

Having thus described certain embodiments of the present invention, various alterations, modifications, and improvements will readily occur to those skilled in the art. Such alterations, modifications, and improvements are intended to be within the spirit and scope of the invention. Accordingly, the foregoing description is by way of example only, and not intended to be limiting. The invention is limited only as defined in the following claims and the equivalents thereof.

What is claimed is:

1. A filter cartridge, comprising:
 a cartridge body;
 a polyester track etched membrane disposed within the cartridge body, that is arranged to form a filter element having an interior including at least one end, where the track etched membrane includes a plurality of pores, and at least one shadow region that is free of pores; and
 at least one leak-free seal that closes the at least one end of the interior of the filer element,
 wherein the track etched membrane is encapsulated by the at least one leak-free seal.

2. The filter cartridge of claim 1, wherein the track etched membrane is pleated.

3. The filter cartridge of claim 1, wherein the cartridge body includes a cage and at least one endcap, wherein the track etched membrane is disposed within the cage, and wherein the at least one leak-free seal is formed between the track etched membrane and the at least one endcap.

4. The filter cartridge of claim 3, wherein the track etched membrane is pleated.

5. The filter cartridge of claim 3, wherein the at least one leak-free seal is formed without an adhesive.

6. The filter cartridge of claim 5, wherein the track etched membrane is pleated.

7. The filter cartridge of claim 3, wherein the track etched membrane and the at least one endcap are formed from compatible materials.

8. The filter cartridge of claim 3, wherein the track etched membrane and the at least one endcap are formed from a same material.

9. The filter cartridge of claim 3, wherein the track etched membrane and the at least one endcap are formed from polyester.

10. The filter cartridge of claim 3, wherein the cage is a cylindrical cage, wherein the at least one endcap includes first and second endcaps disposed at opposite ends of the cylindrical cage, and wherein the at least one leak-free seal includes first and second leak-free seals that respectively seal the track etched membrane to the first and second endcaps.

11. The filter cartridge of claim 10, wherein the track etched membrane is pleated.

12. The filter cartridge of claim 11, further including at least one support layer arranged to support the track etched membrane, the at least one support layer and the track etched membrane being pleated together.

13. The filter cartridge of claim 10, wherein the track etched membrane includes a plurality of pores and first and second shadow regions that are free of pores, the first and second shadow regions respectively extending from the first and second leak-free seals.

14. The filter cartridge of claim 13, wherein the track etched membrane is pleated.

15. The filter cartridge of claim 3, wherein the track etched membrane is formed from a first material and the at least one endcap is formed from a second material, and wherein the at least one leak-free seal includes only the first and second materials.

16. The filter cartridge of claim 3, wherein the track etched membrane and the at least one endcap are formed from a single material, and wherein the at least one leak-free seal includes only the single material.

17. The filter cartridge of claim 3, wherein the track etched membrane includes a plurality of pores, and at least one shadow region that is free of pores, the at least one shadow region extending from the at least one leak-free seal.

18. The filter cartridge of claim 17, wherein the track etched membrane is pleated.

19. The filter cartridge of claim 3, further including at least one support layer arranged to support the track etched membrane, the at least one support layer and the track etched membrane being pleated together, and wherein the track etched membrane, the at least one support layer and the at least one endcap are formed from compatible materials.

20. The filter cartridge of claim 3, further including a strip of material extending from the at least one leak-free seal.

21. The filter cartridge of claim 20, further including at least one support layer arranged to support the track etched membrane, the at least one support layer, the track etched membrane and the strip of material being pleated together, the at least one strip of material, the track etched membrane, the at least one support layer and the at least one endcap being formed from compatible materials.

22. The filter cartridge of claim 21, wherein the track etched membrane includes a plurality of pores, and at least one shadow region that is free of pores, the at least one shadow region extending from the at least one leak-free seal.

23. The filter cartridge of claim 20, further including at least one support layer arranged to support the track etched membrane, the at least one support layer, the track etched membrane and the strip of material being pleated together, the at least one strip of material, the track etched membrane, the at least one support layer and the at least one endcap being formed from a same material.

24. The filter cartridge of claim 1, wherein the track etched membrane has a bubble point when tested separately from the filter cartridge, and wherein the filter cartridge has a bubble point that is at least 90% of the bubble point of the track etched membrane.

25. The filter cartridge of claim 1, wherein the track etched membrane has a bubble point when tested separately from the filter cartridge, and wherein the filter cartridge has a bubble point that is at least 95% of the bubble point of the track etched membrane.

26. The filter cartridge of claim 1, wherein the track etched membrane is formed from a membrane material, and wherein the at least one leak-free seal is formed only from material that is compatible with the membrane material.

27. The filter cartridge of claim 26, wherein the track etched membrane is pleated.

28. The filter cartridge of claim 26, wherein the at least one leak-free seal is formed solely from a same material as the track etched membrane.

29. The filter cartridge of claim 1, wherein the track etched membrane includes a plurality of asymmetrical pores.

30. The filter cartridge of claim 1, further including at least one support layer arranged to support the track etched membrane.

31. The filter cartridge of claim 1, wherein the track etched membrane has a bubble point when tested separately from the filter cartridge, and wherein the filter cartridge has a bubble point that is at least 50% of the bubble point of the track etched membrane.

* * * * *